(12) United States Patent
Hubby, Jr.

(10) Patent No.: US 7,142,340 B2
(45) Date of Patent: Nov. 28, 2006

(54) OPTICAL SCANNER APPARATUSES AND OPTICAL SCANNING METHODS

(75) Inventor: Laurence Meade Hubby, Jr., Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 165 days.

(21) Appl. No.: 10/700,957

(22) Filed: Oct. 31, 2003

(65) Prior Publication Data

US 2005/0094231 A1  May 5, 2005

(51) Int. Cl.
*G02B 26/08* (2006.01)
(52) U.S. Cl. ..................................... 359/216
(58) Field of Classification Search ........ 359/216–218, 359/196

See application file for complete search history.

(56) References Cited

U.S. PATENT DOCUMENTS

| | | | |
|---|---|---|---|
| 4,251,129 A * | 2/1981 | Suzki et al. ................ | 359/218 |
| 4,662,709 A | 5/1987 | Brueggemann | |
| 4,796,965 A | 1/1989 | Ishikawa | |
| 5,475,524 A | 12/1995 | Harris | |
| 5,491,578 A | 2/1996 | Harris | |
| 5,576,854 A | 11/1996 | Schmidt et al. | |
| 6,061,080 A | 5/2000 | Harris | |
| 6,587,246 B1 | 7/2003 | Anderson et al. | |

FOREIGN PATENT DOCUMENTS

| | | |
|---|---|---|
| EP | 0423812 | 4/1991 |
| JP | 60205419 | 3/1986 |
| WO | WO03009048 | 1/2003 |

OTHER PUBLICATIONS

Michael G. Robinson et al., "22.1: Wide Field of View Compensation Scheme for Cube Polarizing Beam Splitters", SID 03 Digest, 2003, p. 874-877.
Kazuo Minoura et al., "A study on laser scanning systems using a monolithic arrayed laser diode", Cannon Inc., Canon Research Center, SPIE vol. 1079 Hard Copy Output, 1989, p. 462-474.

* cited by examiner

*Primary Examiner*—Euncha P. Cherry (57) ABSTRACT

Aspects of the disclosure relate to optical scanner apparatuses, hard imaging devices, optical scanning methods, and hard imaging scanning methods. In one aspect, an optical scanner apparatus is described. The optical scanner apparatus may include an optical scanning device configured to reflect a received light beam towards a photoconductor, and a beam direction system optically coupled to the optical scanning device. The beam direction system may include a plurality of reflectors, and each reflector may be configured to transmit light of one polarization while reflecting light of another polarization. The reflectors may be individually configured to permit passage of the input light beam and a light beam reflected by the scanning device and to reflect another light beam reflected by the scanning device.

44 Claims, 9 Drawing Sheets

_Fig 2_
_PRIOR ART_

_Fig 3_
_PRIOR ART_

OPTICAL SCANNER APPARATUSES AND OPTICAL SCANNING METHODS

FIELD OF THE INVENTION

Aspects of the invention relate to optical scanner apparatuses, hard imaging devices, optical scanning methods, and hard imaging scanning methods.

BACKGROUND OF THE INVENTION

High-resolution, high-speed laser scanning exposure systems for electro-photographic printers employing rotating polygonal mirror scanners and multiple beams are known in the art. In such devices, great care is normally required in the optical design of the scan lens to make the scan geometry at a final image plane insensitive to pyramid error (e.g., wobble) in the polygon mirror, and also to eliminate scan bow. Wobble may normally be prevented by bringing the multiple beams to line foci in a direction orthogonal to the scan plane at the polygon face, and then refocusing the beams at the final image plane. This process may require an anamorphic scan lens, which may be considerably more difficult to make, and hence more expensive, than a rotationally symmetric lens. This approach may also have lower performance potential due to the additional operational constraints.

Scan bow is a variation along the length of a scan between a plurality of beams in a multi-beam scanner due to the distortion characteristics of a scan lens. If not carefully controlled, the scan lens distortion together with the compound angle effect in a rotating polygon scanner may cause scan lines lying above the middle of the scan lens' field of view to be slightly concave in an upward direction, and scan lines lying below the middle of the scan lens' field of view to be slightly concave in a downward direction.

In multi-beam systems configured to write a plurality of scan lines at different vertical locations in a single horizontal swath, the scan bow may cause uppermost and lowermost scan lines to differ in shape, irrespective of placement of the swath in the field of view. When successive swaths are written, the lowermost line from one swath and the uppermost line from the next swath form adjacent lines in the final image. Differences in shape between the swaths may result in visible image defects. Such defects may be made even more visible as defects repeat periodically down a page with each swath.

Distortion of scan lens in the direction of scan is typically controlled so that a final scan coordinate is proportional to polygon scan angle $\theta$. Since $\theta$ varies linearly in time due to continuous uniform rotation of the polygon, pixel information modulated onto write beam(s) at uniform time intervals may then be written at uniform spatial intervals. A scan lens with this distortion characteristic is commonly called an "f$\theta$" lens. The combination of an f$\theta$ lens and a polygon scanner fails to produce straight scan lines away from the scan axis. Since in multi-beam scanning systems, all but one of the scan lines are preferred to be positioned either above or below the scan axis, such a system will exhibit scan bow.

In exemplary prior laser scanning systems, anamorphic balancing was used to provide scan bow within acceptable limits. Anamorphic balancing takes advantage of an anamorphic lens having different distortion characteristics in the two directions normal to its optic axis. The distortion experienced by a beam traversing the lens with field components in both directions may be determined by a geometric scan of the lens' two different distortion characteristics operating separately on the beam's respective field components.

Thus, beams scanned exactly along one axis or the other may encounter only the corresponding distortion characteristic. However, beams scanned along any other lines may encounter a composite distortion characteristic depending upon the relative magnitude of the beam's field components in the two directions. This approach allows compensation of the scan bow due to the distortion along the scan, axis in a narrow region near the scan axis by a large distortion in the orthogonal direction of the opposite sign of the scan bow.

Anamorphic balancing places additional demands upon the scan lens and restricts the degrees of freedom that may be used to satisfy other demands, such as increases in the format width and the number of resolvable spots desired of the lens.

An alternative approach to scan bow control uses a rotationally symmetric scan lens with an fsin$\theta$ distortion characteristic. A scan lens with this distortion exactly compensates for the scan bow characteristic of the rotating polygon mirror, resulting in zero net scan bow for scan lines placed anywhere within the field. However, in such a system, the final scan coordinate may not be proportional to "$\theta$", and information may have to be modulated onto the beam(s) at non-uniform time intervals in order to be written at uniform spatial intervals.

Figure 1A:
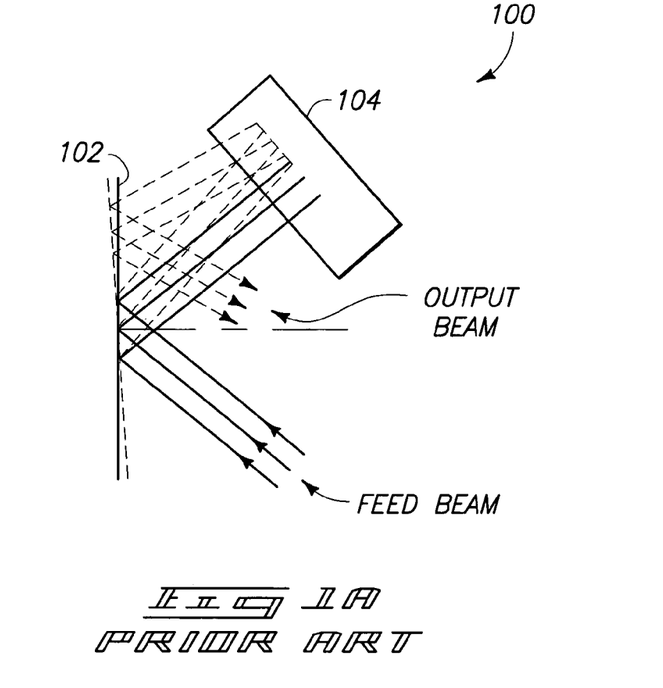
FIGS. 1A–1B show a plan view and an elevation view, respectively, of a conventional optical scanner apparatus.

FIG. 1A illustrates a plan view of a prior art arrangement 100 to overcome the inherent wobble correction defect found in a system of the fsin$\theta$ type as described above. Wobble correction defect may be overcome by using arrangement 100 in order to permit a beam of light to double bounce off of a scanning device 102 (e.g., rotating polygon mirror).

Continuing to refer to FIG. 1A, a roof reflector 104 oriented with a roof intersection line in the plane of scan may be used to re-direct a scanned beam to the same polygon face of the scanning device 102 for a second reflection. The double bouncing of a beam of light has the effect of removing any change of angle in the cross-scan direction that may have been imparted to the beam due to polygon pyramid error on the first bounce from the scanning device 102.

Figure 1B:
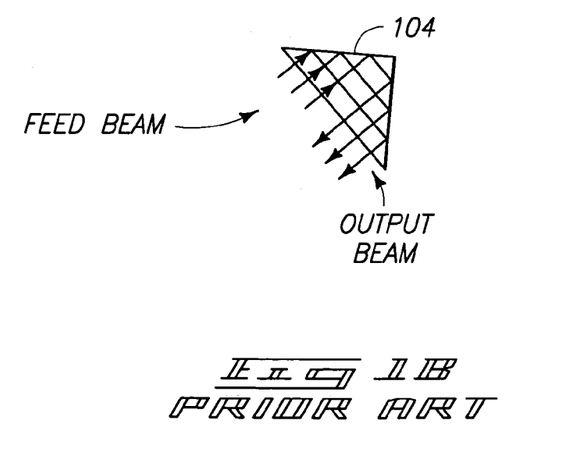

FIG. 1B shows an elevation view of roof reflector 104 of arrangement 100 shown in FIG. 1A. Disadvantages exist with the arrangement of FIG. 1A providing the self-correction action and include utilization of a larger polygon when compared to a polygon used in a single bounce system, and particularly so if the scan angle is large. For example, beam diameter at the input to an fsin$\theta$ scan lens required for a scanner desired to cover a 500 mm wide format with a ±30° scan to produce a ~45 micron spot diameter (FW @ 1/e$^2$) is about 15 mm. For FIG. 1A, the angle between an incoming beam to the polygon 102 and an outgoing beam to the roof reflector 104 having the minimum polygon facet length was found to be around 50°. An angle of 45° between an incoming beam to the polygon 102 may require the roof reflector 104 to be placed farther away from the polygon 102 to clear the lowermost scanned beam, thus requiring both a larger roof and a larger facet because of the angular spread of the scanned beams. A scan angle of 55° allows a slightly smaller roof to be placed closer to the polygon 102, but again requires a larger facet because of the more oblique second bounce). The resulting deflection system is shown in FIG. 2.

Figure 2:
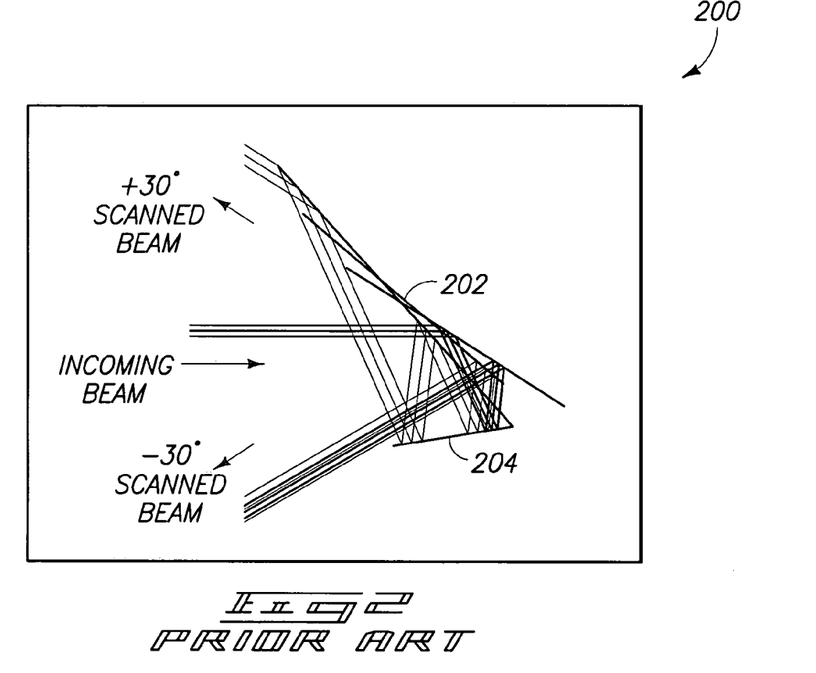
FIG. 2 shows a conventional double-bounce deflection system of an optical scanner apparatus.

FIG. 2 shows a double bounce deflection system 200 using a conventional roof reflector 204. Polygon 202 may have to be designed to have facets that are 126 mm in width.

For example, for a 12-sided polygon, the facet width would correspond to a diameter of 470 mm (>18"). Such a large polygon would be relatively expensive to manufacture, and may be difficult to spin at speeds as high as 16K rpm without serious distortion of the optical figure of the facets.

Figure 3:
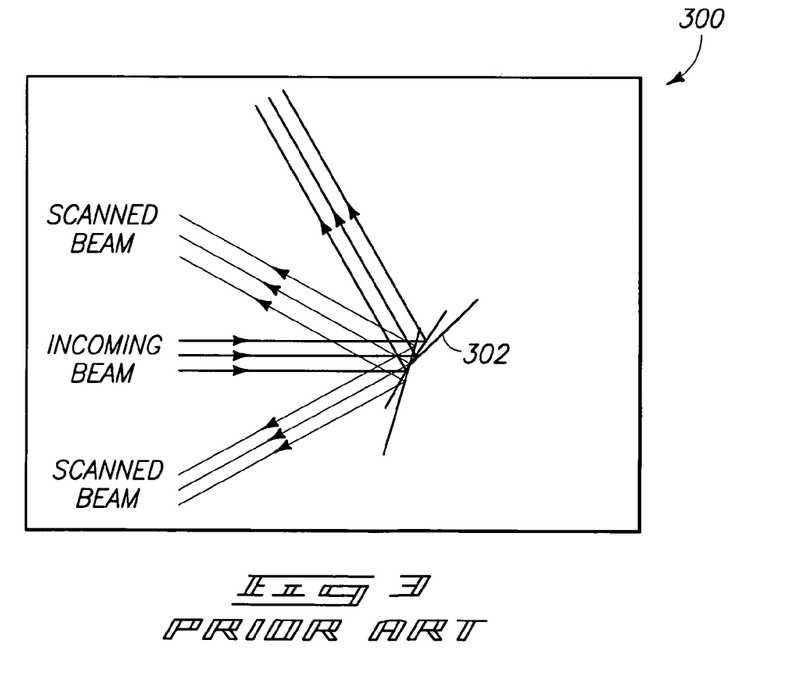
FIG. 3 shows a conventional single-bounce deflection system of an optical scanner apparatus.

FIG. 3 shows a conventional single-bounce deflection system 300, using a polygon 302, for the same beam size and angular scan range illustrated in FIG. 2. The deflection system 300, however, may need a polygon having only six facets, individual facets having a width of only 50 mm, the width corresponding to a polygon diameter of 86.6 mm. This leads to increased cost and complexity, as well as limitations with respect to optical performance (i.e., such a system may not cover as wide a field at a given (high) resolution).

SUMMARY OF THE INVENTION

At least some embodiments of the invention relate to optical scanner apparatuses, hard imaging devices, optical scanning methods, and hard imaging scanning methods.

In one aspect, an optical scanner apparatus is described. The optical scanner apparatus may include an optical scanning device configured to reflect a received light beam towards a photoconductor, and a beam direction system optically coupled to the optical scanning device. The beam direction system may include a plurality of reflectors, and each reflector may be configured to transmit light of one polarization while reflecting light of another polarization. The reflectors may be individually configured to permit passage of one of an input light beam provided by an external source and a light beam reflected by the scanning device and to reflect another light beam reflected by the scanning device. Individual ones of reflectors include a polarization beam splitter coating configured to cause a light beam from the scanning device to be either reflected by the individual one of the reflectors towards another of the reflectors or transmitted through the individual one of the reflectors towards the photoconductor.

In another aspect, an optical scanning method is described. The method includes first receiving an input light beam by a scanning device, and first reflecting the input light beam towards a first reflector using the scanning device. The method also includes second receiving a light beam reflected by the scanning device by the first reflector, and first redirecting the light beam received by the first reflector towards a second reflector. The light beam received by the second reflector is redirected towards the scanning device by the second reflector, and the light beam received by the scanning device is reflected towards a photoconductor using the scanning device. The method further includes passing an input light beam through the first reflector before the first receiving, and passing the light beam output from the first reflector through a first optical device.

Other aspects are disclosed herein as is apparent from the following description and figures.

DESCRIPTION OF THE DRAWINGS

FIG. 7 is a block diagram of an optical scanner apparatus illustrating double bouncing of a beam of light using an optical scanning device according to one embodiment.

DETAILED DESCRIPTION OF THE INVENTION

The optical scanner apparatus of the present invention may be capable of covering a scan area having a relatively wide format (e.g., without a need for an anamorphic lens). A double bounce geometry of the optical scanner apparatus according to one embodiment may provide correction of polygon wobble, and also allow use of a smaller and more practical polygon.

Figure 4:
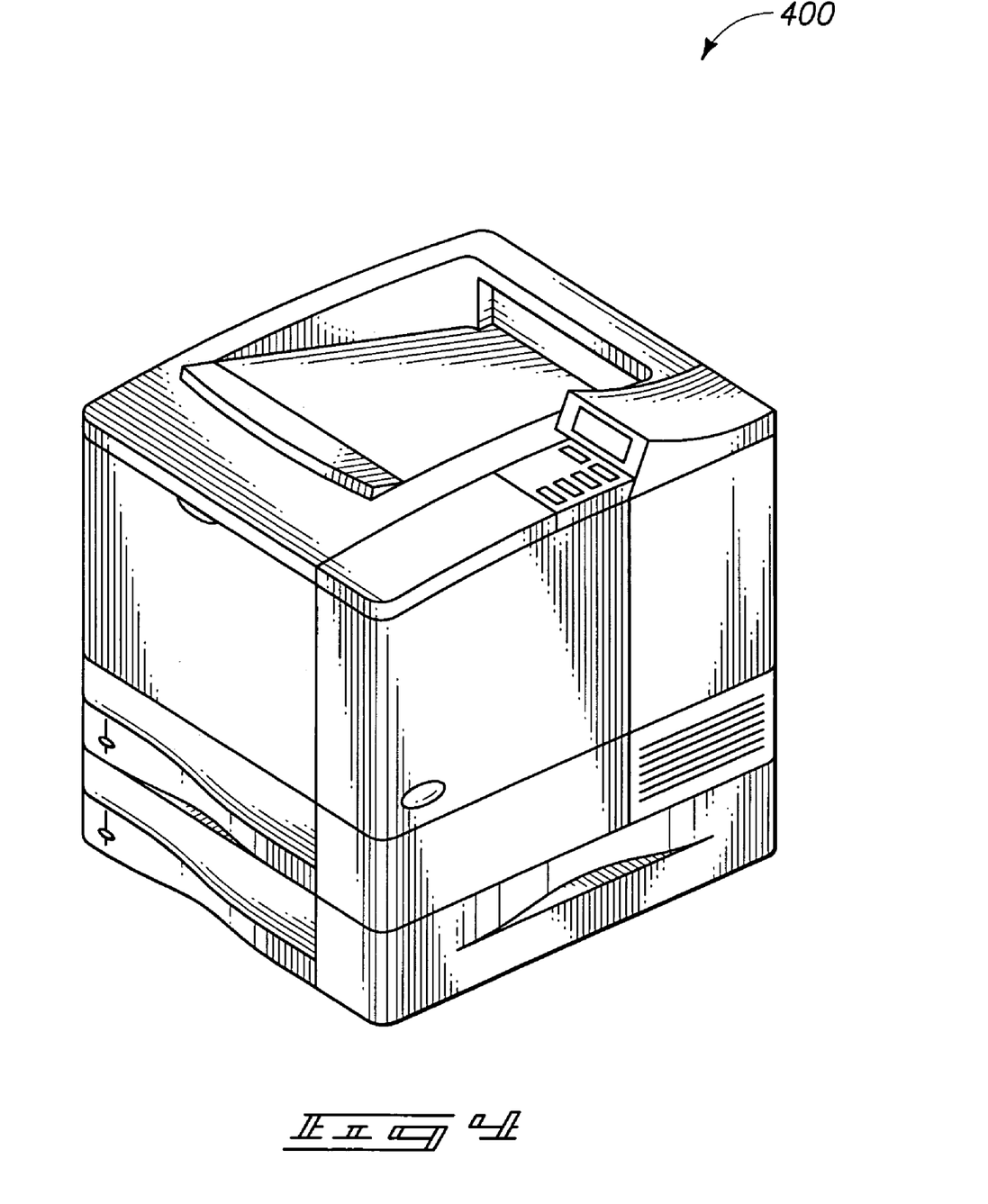
FIG. 4 is an isometric view of a hard imaging device in accordance with one embodiment.

Referring to FIG. 4, an exemplary hard imaging device 400 configured to physically render hard images upon media is shown in accordance with one embodiment. The hard imaging device 400 may be a laser printer. Other configurations to form hard images upon media are possible, and include for example, multi-function peripherals, copiers, facsimile devices, etc.

Figure 5:
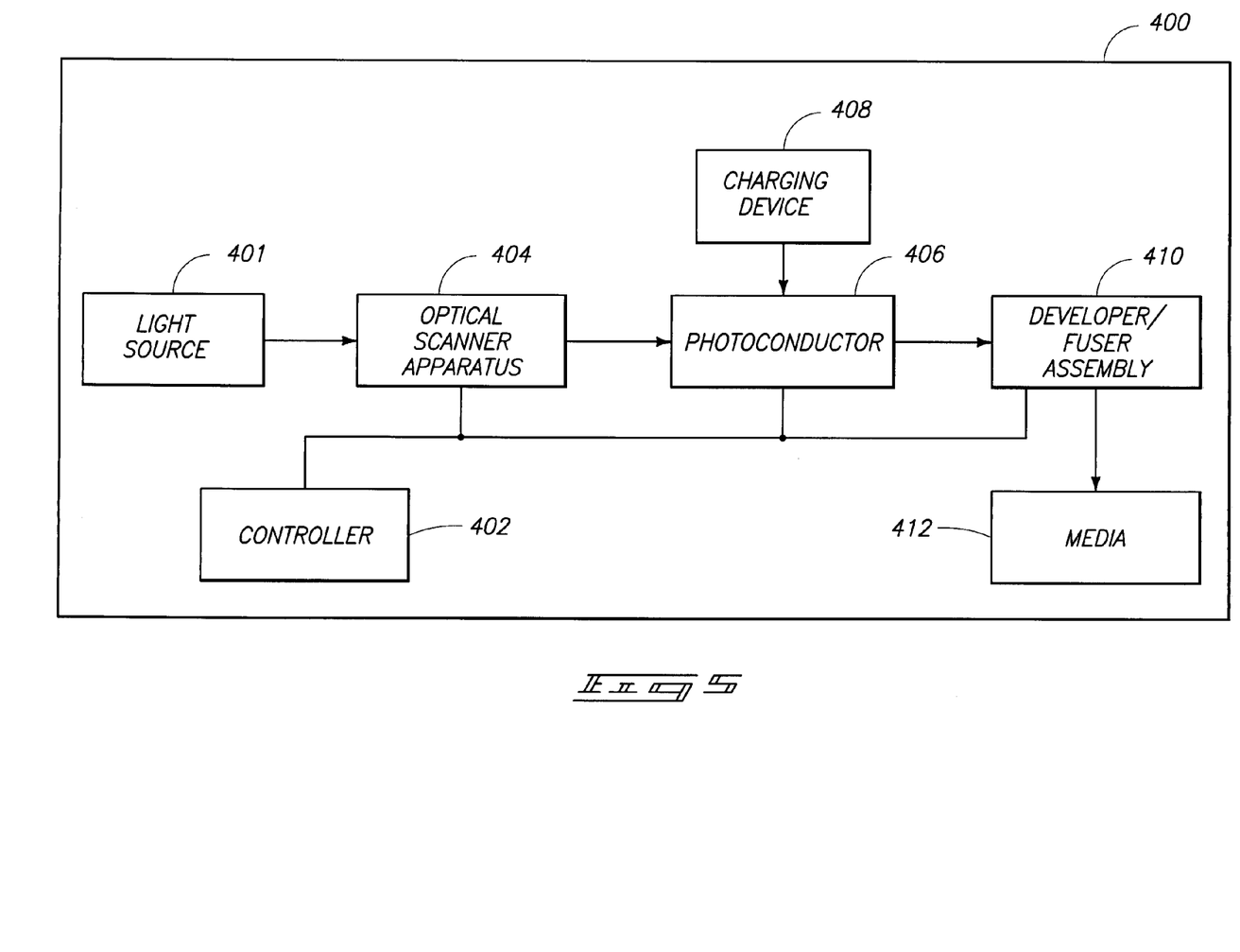
FIG. 5 is a high-level block diagram of a hard imaging device according to one embodiment.

FIG. 5 is an exemplary high-level block diagram of the hard imaging device 400 according to one embodiment. The depicted hard imaging device 400 configured as a laser printer includes a light source 401, a controller 402, an optical scanner apparatus 404, a photoconductor 406, a charging device 408, and a developer and fusing assembly 410 configured to form hard images on media 412.

The light source 401 may include a laser or other light source configured to output a light beam that may be scanned by the optical scanner apparatus 404 towards photoconductor 406, in one embodiment. Light source 401 may emit the light beam comprising data of an image to be formed and outputted by controller 402.

The controller 402 may be configured to control operations of one or more of individual components (e.g., 401, 404, 406, 408, and 410) of the hard imaging device 400. Exemplary operations of controller 402 include image data processing operations (e.g., rasterization) of data received from an external source (not shown), internally generated, or otherwise accessed.

The optical scanner apparatus 404 may be configured to scan the beam of light (e.g., information) emitted from light source 401 onto photoconductor 406 to form latent images.

The photoconductor 406 includes a rotating imaging surface configured to receive information scanned by the optical scanning apparatus 404. One or more beams of light (e.g., lines of information) may be scanned by optical scanner apparatus 404 onto photoconductor 406.

The charging device 408 may be configured to charge the photoconductor 406 to enable forming of latent images on the photoconductor 406. In particular, charging device 408 provides a negative charge to the surface of photoconductor 406 and the scanned light beam discharges portions of the charged surface to form latent images in one embodiment.

The developer and fusing assembly 410 may be configured to develop latent images formed on photoconductor 406 using a marking agent (e.g., toner), and transfer and fuse the developed image to media 412 (e.g., hard-imaging media such as paper, transparencies, etc.).

Figure 6:
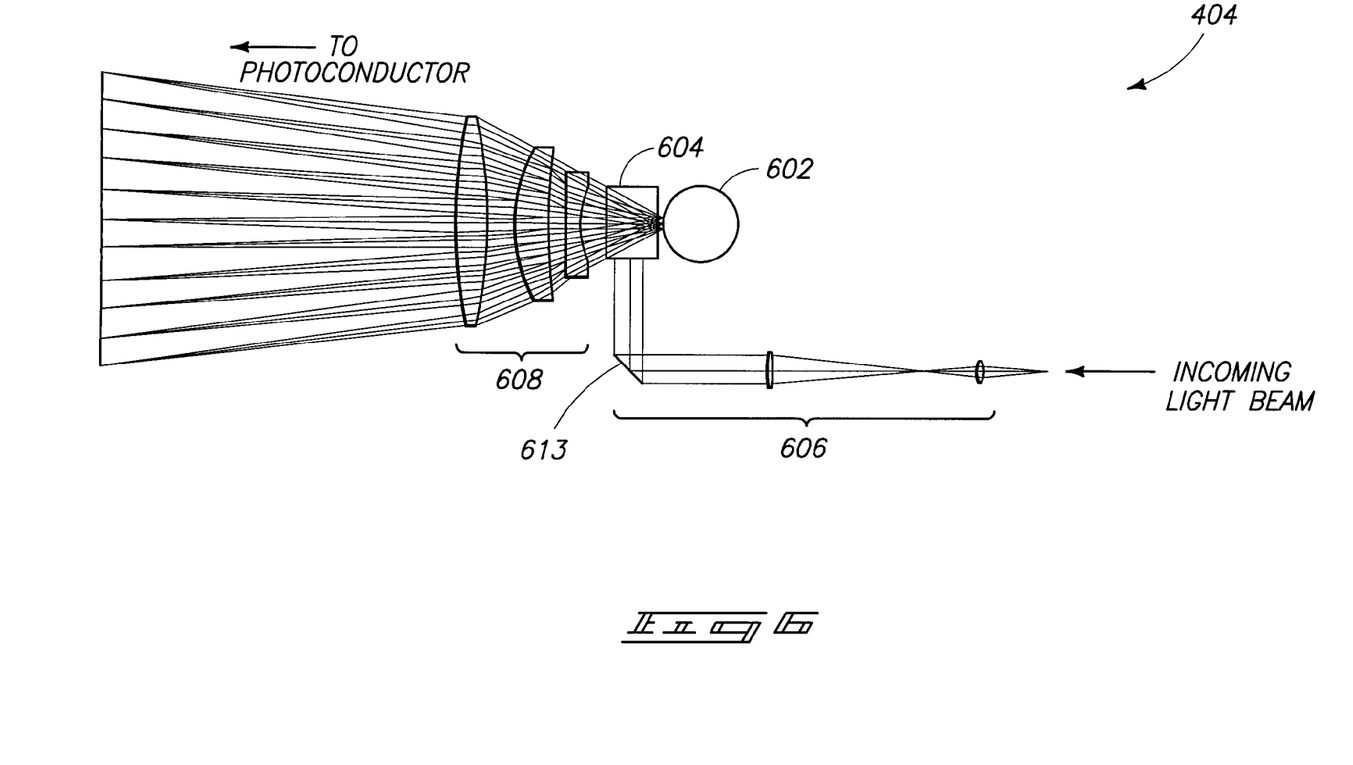
FIG. 6 is a plan view of an optical scanner apparatus according to one embodiment.

FIG. 6 is a plan view of an optical scanner apparatus 404 according to one embodiment. The optical scanner apparatus 404 includes an optical scanning device 602 (e.g., rotating polygon mirror having a plurality of facets), a beam direction system 604 (e.g., circulator), input optics 606 (e.g., a collimator system), and output optics 608 (e.g., fsinθ scan lens). The optical scanning device 602 may be alternatively referred to as a rotating reflection device.

A light beam from light source 401 (FIG. 5) may be received by input optics 606. The input optics 606 may be configured to direct the light beam from light source 401 towards beam direction system 604. In one embodiment, the light beam from source 401 and input optics 606 is configured to pass through the beam direction system 604 prior to being scanned by scanning device 602 towards photoconductor 406. The scanned light is directed by output optics 608 to photoconductor 406 in the depicted embodiment. FIG. 6 depicts one fold mirror 613 configured to direct light upwardly from a horizontal direction. Although not shown in FIG. 6, one or more additional fold mirrors may be provided to receive light from fold mirror 613 and to redirect the light from the upwardly traveling direction of FIG. 6 into a perpendicular horizontal direction towards scanning device 602. Other embodiments are possible for introducing light to scanning device 602.

FIG. 7 is an exemplary block diagram of optical scanner apparatus 404 illustrating a configuration having a beam direction system 604 configured to permit passage of both an input light beam 601 from light source 401 and an output light beam 611 scanned by scanning device 602 through the beam direction system 604. The beam direction system 604 may be configured as an optical circulator in one embodiment. Beam direction system 604 is configured to permit input light beam 601 from light source 401 to pass through the beam direction system 604 to produce a light beam 603. The scanning device 602 reflects light beam 603 (e.g., first bounce) to produce a light beam 605 which is directed towards the beam direction system 604 for a reflection towards the scanning device 602. The beam direction system 604 is further configured to reflect light beam 605 received from the scanning device 602 to produce a light beam 607. The scanning device 602 reflects the light beam 607 (e.g., second bounce) providing and directing light beam 609 towards the beam direction system 604. The beam direction system 604 is configured to pass light beam 609 as light beam 611 that is scanned onto photoconductor 406. Further details of reflecting a light beam by the scanning device 602 are described below at FIG. 9A.

Figure 8B:
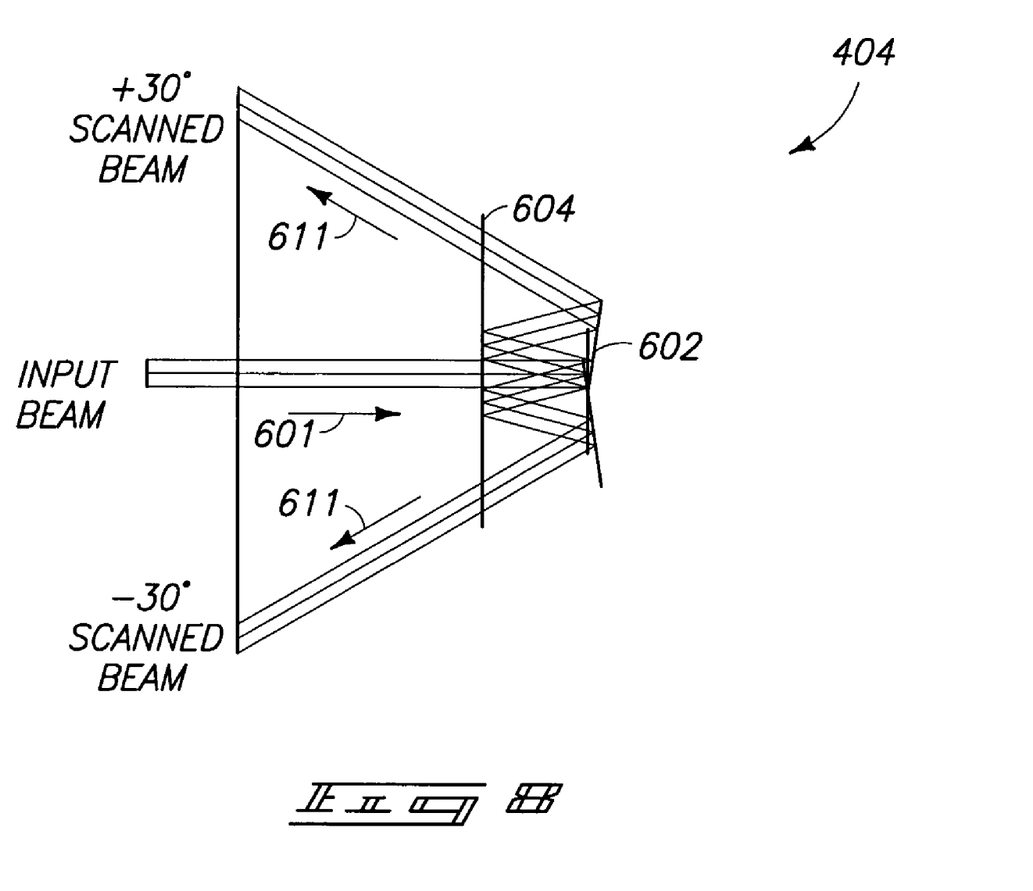
FIG. 8 is a plan view of an optical scanner apparatus illustrating a beam direction system according to one embodiment.

FIG. 8 is a plan view of optical scanner apparatus 404 according to one embodiment. As noted above, the optical scanner apparatus 404 includes a beam direction system 604 and a scanning device 602 (e.g., a plurality of facets of an exemplary device 602 comprising a polygon mirror are shown). In one embodiment, the beam direction system 604 is positioned such that one or both the input and output light beams 601, 611, respectively, are permitted to pass through the beam direction system 604. The output light beam 611 is scanned onto photoconductor 406 by the scanning device 602. The exemplary configuration of FIG. 8 including beam direction system 604 passing at least one of the beams 601, 611 permits the optical scanner apparatus 404 to have a smaller and more practical scanning device 602 with a compact geometry compared with the configurations of FIG. 1A or FIG. 2, for example, while still providing relatively wide scan angles.

Figure 9A:
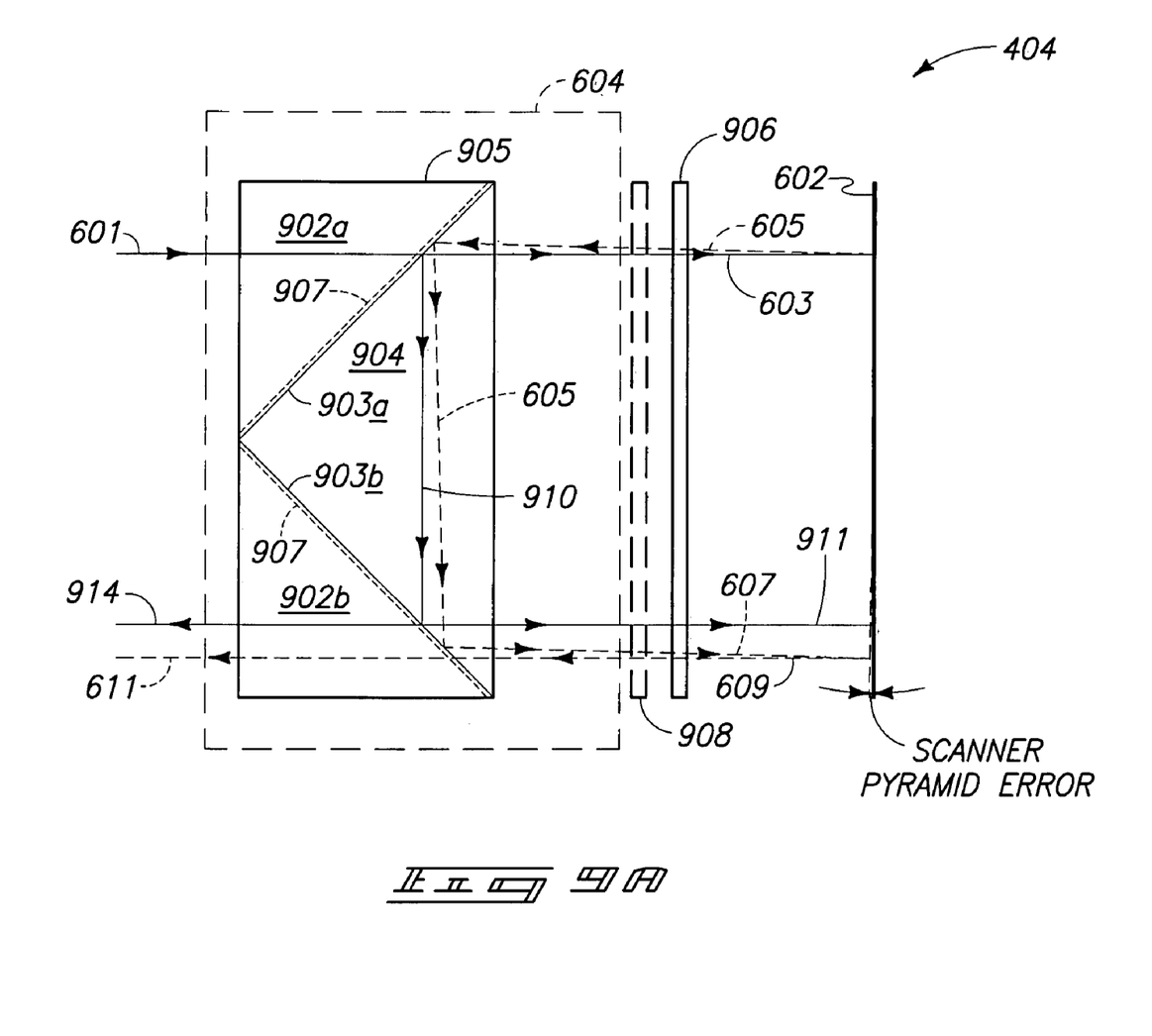
FIGS. 9A–9B show elevation views of an optical scanner apparatus illustrating a beam direction system according to various embodiments.
Figure 9B:
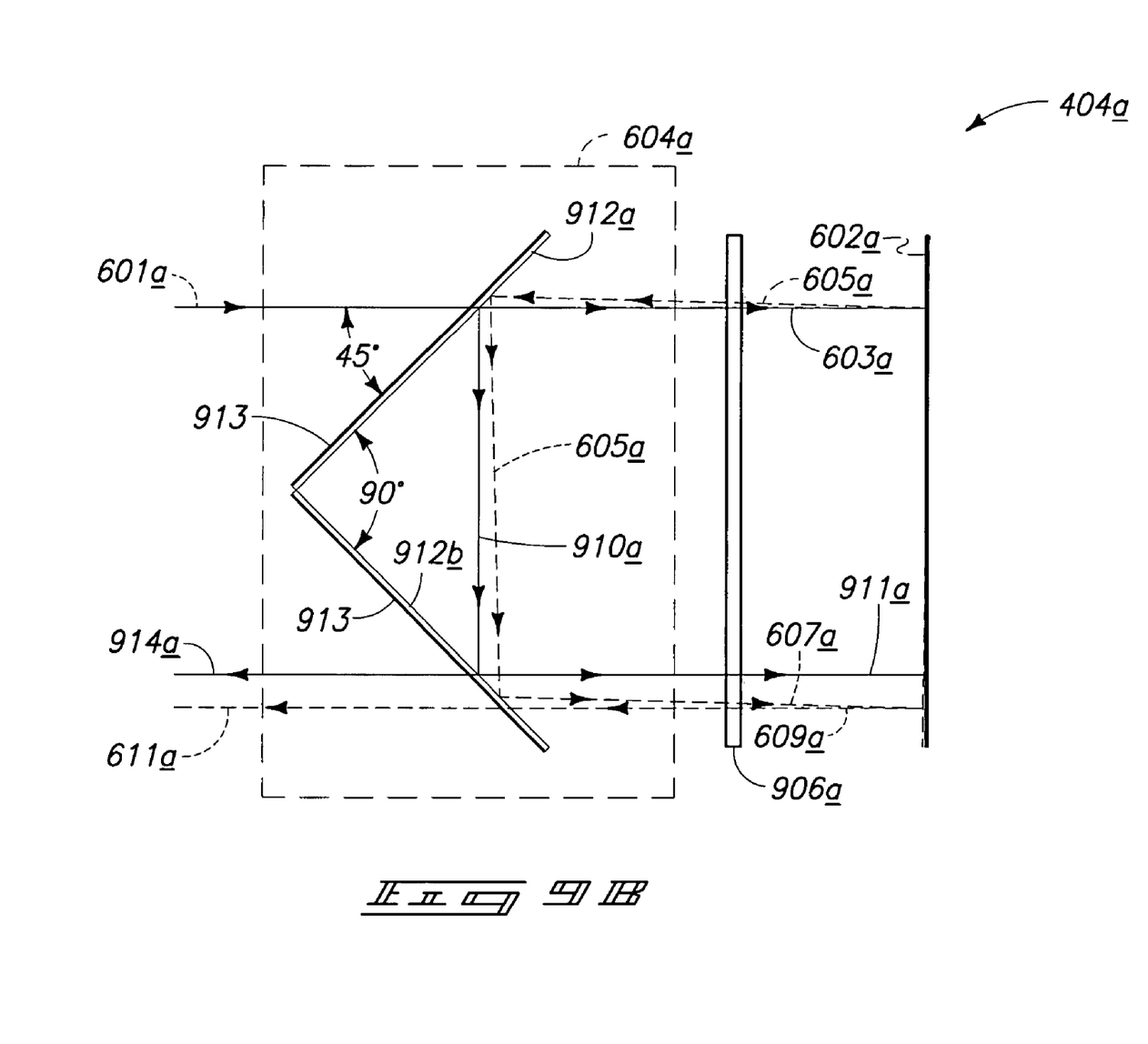

FIGS. 9A–9B show elevation views of an optical scanner apparatus according to various embodiments.

Referring to FIG. 9A, an exemplary optical scanner apparatus 404 includes a facet of an exemplary scanning device 602 and beam direction system 604. As noted above, the beam direction system 604 is configured and positioned such that input light beam 601, and output light beam 611 scanned by the scanning device 602 are permitted to pass through the beam direction system 604. Although a single input light beam 601 is shown for ease of illustration, a plurality of input light beams (e.g., a fan of light beams) are possible.

In one embodiment, beam direction system 604 includes first and second matching prisms 902a, 902b, and a third prism 904. The first and second matching prisms 902a, 902b may comprise reflectors such as roof reflectors and third prism 904 may comprise a roof prism in one embodiment. Respective surfaces 903a, 903b of the first and second prisms 902a, 902b may be coated with a polarizing beamsplitter coating 907 in order to highly transmit light of a first polarization type (e.g., horizontal polarization light components) while substantially or totally reflecting light having a polarization (e.g., vertical polarization light components) that is opposite to the first polarization type. In one exemplary case, the first and second prisms 902a, 902b and the roof prism 904 may be attached together (e.g., using glass affixing material) to form a rectangular block 905. For the exemplary embodiment shown in FIG. 9A, the polarization beamsplitter coating may be a multi-layer dielectric thin film polarizing beamsplitter coating. Other configurations of prisms 902a, 902b to permit passage of a first polarization type and reflection of a different second polarization type are possible.

The optical scanner apparatus 404 further includes optical devices 906, 908 disposed between beam direction system 604 and scanning device 602. In one exemplary case, optical device 908 may be a compensator, such as an O-plate. One exemplary O-plate is a Liquid Crystal Polymer (LCP) compensator. Compensator 908 may have its axis aligned at an angle of 0 degrees with respect to an entering polarization of light, and optical device 906 may be a quarter waveplate having its axis aligned at an angle of 45 degrees with respect to an entering polarization of light. In one embodiment, device 906 is positioned between device 908 and scanning device 602. Compensator 908 may be optionally used in optical scanner apparatus 404 in order to prevent loss of desired polarization due to incomplete reflection and transmission at various device interfaces in the optical scanner apparatus 404. In other embodiments, compensator 908 is omitted, and if desired, the output power of the light source may be increased to account for losses.

In the embodiment of FIG. 9A, light beam 605 scanned by the scanning device 602 towards the beam direction system 604, and incoming light beam 603 received by the scanning device 602 from the beam direction system 604 are shown to trace distinct optical paths, for ease of illustration. The distinct optical paths result from variations (e.g., pyramid variations) present in the scanning device 602 in one example.

However, in the absence of a pyramid error in the scanning device 602, an optical path of the output light beam 605 scanned by the scanning device 602 towards the beam direction system 604 retraces a path of a corresponding input light beam 603 received by the scanning device 602 from the beam direction system 604. The reflected light beam is then redirected towards the scanning device 602 using the first and second prisms 902a, 902b and following an optical path indicated by reference numerals 910, 911. The redirected light beam 911 received by the scanning device 602 is scanned towards the photoconductor 406 (FIG. 5) following optical path 914. If pyramid error is present, the light beam may be provided at a path illustrated by light beam 611.

In operation, with reference to exemplary optical scanner apparatus 404 having compensator 908, incoming light beam 601 encounters prism 902a and beamsplitter coating (e.g., multi-layer beamsplitter coating) provided on surface 903a of prism 902a. The incoming light beam 601 comprises a polarization in a same direction that the beam splitter coating on surface 903a transmits. Therefore, the incoming light beam 601 is highly transmitted and its polarization state is aligned with the polarization of the remainder of rectangular block 905 (e.g., the incoming light beam 601 passes through prism 902a and prism 904 without suffering significant losses). Light beam 603 output from rectangular block 905 next encounters compensator 908.

Compensator 908 is configured to rectify any misalignments in a polarization direction of light beam 601. Compensator 908 may also be used to correct for misalignments (e.g., skew) in s- and p-planes of incidence (e.g., s-plane of incidence corresponding to a perpendicular polarization component of a light beam, and p-plane of incidence corresponding to a parallel polarization component of the light beam) when a reflected beam 605, 607 encounters prisms 902a, 902b at a compound angle of incidence (e.g., near either end of a scan) by causing a rotation in polarization of a skew light beam.

When the incidence angle is compound, the s- and p-planes of a reflected light beam 605, 607 are rotated due to a purely geometric effect, and reflection characteristics of the multi-layer beamsplitter coating provided on surfaces 903a, 903b of respective prisms 902a, 902b are influenced by the s- and p-planes of incidence of the reflected light beam. The compound angle of incidence may cause a portion of the reflected light beam 605, 607 desired to be reflected and transmitted at surfaces 903a, 903b to instead be transmitted and reflected and consequently lost, thereby reducing the efficiency of optical scanner apparatus 404 while also contributing to potential sources of stray light. Accordingly, as mentioned above, compensator 908 may be used in at least some embodiments to correct the misalignments. Compensator 908 may also be used to produce a rotation in polarization direction of a skew light beam (e.g., light beam with misalignments in s- and p-planes of incidence) passing through it in order to compensate for the skew.

Light beam 603 after passing through compensator 908 encounters quarter waveplate 906 configured to convert linearly polarized light into circularly polarized light. For example, linearly polarized light of entering light beam 603 is converted to a light beam having circularly polarized light by quarter waveplate 906. In one example, conversion may include designing a thickness of the quarter waveplate 906 such that the phase difference is ¼ wavelength, and if the angle between electric field vector of an incident linearly polarized light of light beam 603 and a retarder principal plane of the quarter waveplate 906 is 45 degrees, then a light beam output from quarter waveplate 906 is circularly polarized.

Light beam 603 with circularly polarized light and output from quarter waveplate 906 is first reflected (e.g., first bounce) by the scanning device 602 to produce light beam 605. After reflection from the scanning device 602, handedness of the light beam 605 is reversed with respect to light beam 603 (e.g., right circular polarization is converted to left circular polarization, and vice-versa). The light beam 605 now encounters and passes through the quarter waveplate 906. Upon passing through the quarter waveplate 906, polarization of the light beam 605 is converted from a circular polarization to a linear polarization that is orthogonal to a polarization state (e.g., polarization vector directed into the page in the illustrated FIG. 9A) of the incoming light beam 603. Such conversion enables light beam 605 passing through the compensator 908 towards the rectangular block 905 to be highly reflected upon encountering surface 903a of prism 902a.

Light beam 605 that is highly reflected by surface 903a of prism 902a is directed towards surface 903b of prism 902b. Since the properties of light beam 605 remain unchanged upon reflection from surface 903a, the light beam 605 is reflected by surface 903b of prism 902b towards the scanning device for a second reflection (e.g., second bounce as light beam 607). Light beam 607 passes through compensator 908 and quarter wave plate 906 prior to a second reflection (e.g., second bounce) by scanning device 602. Upon passing through compensator 908, quarter waveplate 906, light beam 607 and reflected light beam 609 (e.g., after second bounce from scanning device 602) encounter similar actions described above with respect to passing of light beam 601 and reflected light beam 605 (e.g., after first bounce from scanning device 602) through compensator 908, quarter waveplate 906 (e.g., conversion of linear polarization to circular polarization, and reversal of handedness upon second reflection by scanning device 602). The compensator 908 imparts a slight rotation to linearly polarized light beam 609 output from quarter waveplate 906 towards the photoconductor 406 (FIG. 5) in order to correct for a compound angle effect at a second encounter with prism 902b. Upon encountering prism 902b, light beam 609 may be strongly transmitted since its polarization is rotated to its initial direction (e.g., vertical direction in the illustrated FIG. 9A). Light beam 611 is then output from the beam direction system 604 for scanning onto photoconductor 406.

Referring to FIG. 9B, another exemplary embodiment of optical scanner apparatus is shown wherein like elements are identified with like numerals with a suffix "a" added. In this embodiment, instead of prisms 902a, 902b, 904, a beam direction system 604a of optical scanner apparatus 404a may include a pair of flat glass plates 912a, 912b having a wire grid type polarizing coating 913. An exemplary wire grid type polarizing coating 913 may be obtained from Moxtek, Inc., of Orem, Utah. In one exemplary case, the glass plates 912a, 912b may be oriented at an angle of 90 degrees with respect to one another, and at an angle of 45 degrees with respect to an incoming light beam 601a. The compensator 908 depicted in FIG. 9A is not desirable in the embodiment of FIG. 9B as the reflection characteristics of wire grid polarizing coating are not tied to the s- and p-plane directions, but are instead tied to the direction of wires used in the coating. But for the differences identified above, operation of optical scanner apparatus 404a having beam direction system 604a is substantially similar to the operation of optical scanner apparatus 404 described above at FIG. 9A.

Exemplary advantages of the present invention include providing an optical scanner apparatus capable of covering a wide format (e.g., 500 mm or 700 mm) due to good imaging properties of non-anamorphic scan lens, elimination of a need for an anamorphic lens to correct polygon wobble and scan bow, thereby improving performance of output optics (e.g., scan lens) to achieve a larger number of resolvable spots corresponding to a wider format, and to achieve improved resolution over a wide format compared to conventional approaches. Other advantages include elimination of scan bow, and correction of polygon wobble using double bounce geometry provided by the circulator while maintaining a reasonable polygon size. For example, using a twelve beam laser array source and twelve facet polygon, the optical scanner apparatus of the present invention may achieve a process speed of 1.5 m/sec at a print density of 813 scan lines/inch with a polygon rotation speed of 16 K rpm. If a twenty four beam source is used, rotation speed of the polygon may be halved.

The protection sought is not to be limited to the disclosed embodiments, which are given by way of example only, but instead is to be limited only by the scope of the appended claims.

What is claimed is:

1. An optical scanner apparatus, comprising:
   an optical scanning device configured to reflect a received light beam towards a photoconductor;
   a beam direction system optically coupled to the optical scanning device and comprising plurality of reflectors, each reflector configured to transmit light of one polarization while reflecting light of another polarization; and
   wherein the reflectors are individually configured to permit passage of one of an input light beam provided by an external source and a light beam reflected by the scanning device and to reflect another light beam reflected by the scanning device.

2. The apparatus of claim 1, wherein individual ones of reflectors comprise a polarizing coating configured to cause a light beam from the scanning device to be either reflected by the individual one of the reflectors towards another of the reflectors or transmitted through the individual one of the reflectors towards the photoconductor.

3. The apparatus of claim 1, wherein individual ones of the reflectors comprise a polarizing coating configured to pass light of a first polarization direction and reflect light having a polarization direction opposite to the first polarization direction.

4. The apparatus of claim 1, further comprising:
   a first optical device disposed between the beam direction system and the optical scanning device, the first optical device configured to convert a first type of polarized light into a second type of polarized light to cause a light beam reflected by the scanning device to be reflected upon encountering a first reflector among the plurality of reflectors.

5. The apparatus of claim 4, wherein the first type comprises linearly polarized light and the second type comprises circularly polarized light.

6. The apparatus of claim 4, wherein the first optical device comprises a quarter waveplate oriented at an angle of 45 degrees with respect to an entering polarization direction of a light beam.

7. The apparatus of claim 4, further comprising:
   a second optical device disposed between the beam direction system and the first optical device to reduce stray light components.

8. The apparatus of claim 1, wherein the scanning device is configured to convert right circular polarization of a light beam received by the scanning device into left circular polarization to cause reflection of the light beam upon encountering an individual reflector among the plurality of reflectors.

9. The apparatus of claim 1, further comprising a second optical device is configured to rotate a polarization of a light beam reflected by the scanning device and passing through the second optical device towards the photoconductor in order to rectify misalignment of a polarization direction of the light beam passing through the second optical device.

10. The apparatus of claim 9, wherein the second optical device comprises a compensator oriented at an angle of 0 degrees with respect to an entering polarization direction of a light beam.

11. The apparatus of claim 1, wherein each reflector comprises a prism.

12. The apparatus of claim 1, wherein each reflector comprises a pair of glass plates arranged at an angle of 90 degrees with respect to each other and at an angle of 45 degrees with respect to an input light beam.

13. The apparatus of claim 1, wherein the optical scanning device comprises a rotating polygon mirror.

14. The apparatus of claim 1, wherein one of the reflectors is configured to permit passage of the input light beam before being reflected using the scanning device.

15. An optical scanner apparatus, comprising:
   a scanning device configured to reflect an input light beam from an external light source as an output light beam towards a photoconductor; and
   a beam direction system configured to rectify scanning errors, and wherein the beam direction system is disposed between the light source and the scanning device to permit passage of both the input light beam and the corresponding output light beam reflected by the scanning device towards the photoconductor.

16. The apparatus of claim 15, further comprising:
   a first optical device disposed between the beam direction system and the scanning device, the first optical device configured to convert linearly polarized light into circularly polarized light to cause a light beam scanned by the scanning device to be reflected upon encountering the beam direction system.

17. The apparatus of claim 16, wherein the beam direction system comprises a plurality of reflectors individually configured to permit passage of light of a first polarization direction while reflecting light having a polarization direction opposite to the first polarization direction.

18. The apparatus of claim 16, further comprising:
   a second optical device disposed between the beam direction system and the first optical device, and wherein the second optical device is configured to rotate a polarization of a light beam reflected by the scanning device and passing through the second optical device in order to correct misalignment of a polarization direction of the light beam passing through the second optical device.

19. The apparatus of claim 18, wherein the second optical device comprises a compensator oriented at an angle of 0 degrees with respect to an entering polarization direction of a light beam.

20. A hard imaging device, comprising:
   emission means for emitting an input light beam;
   scanning means comprising a plurality of reflector means individually comprising means for transmitting light of one polarization while reflecting light of another polarization different than the one polarization;
   photoconductor means for receiving an output light beam scanned by the scanning means; and wherein the reflector means further individually comprise means for permitting passage of one of the input light beam and the output light beam and for reflecting another light beam reflected by the scanning means in a direction towards the photoconductor means.

21. A hard imaging device, comprising:
a light source for emitting an input light beam towards a scanning device;
a photoconductor configured to receive a light beam scanned by the scanning device; and
an optical scanner apparatus, comprising:
a beam direction system optically coupled to the scanning device and comprising a plurality of reflectors, each reflector configured to transmit light of one polarization while reflecting light of another polarization different than the one polarization; and
wherein the reflectors are individually configured to permit passage of one of the input light beam and the light beam reflected by the scanning device and to reflect another light beam reflected by the scanning device towards the photoconductor.

22. The device of claim 21, wherein the optical scanner apparatus further comprises:
a first optical device disposed between the beam direction system and the scanning device, the first optical device configured to convert linearly polarized light into circularly polarized light to cause the light beam scanned by the scanning device to be reflected upon encountering a first reflector among the plurality of reflectors.

23. The device of claim 22, wherein the optical scanner apparatus further comprises:
a second optical device disposed between the beam direction system and the first optical device, and wherein the second optical device is configured to correct misalignment of a polarization direction of a light beam passing through the second optical device.

24. An optical scanning method, comprising:
first receiving an input light beam by a scanning device;
first reflecting the input light beam towards a first reflector using the scanning device;
second receiving a light beam reflected by the scanning device by the first reflector;
first redirecting the light beam received by the first reflector towards a second reflector;
second redirecting the light beam received by the second reflector towards the scanning device to increase a scan angle of the light beam; and
second reflecting the light beam redirected by the second reflector onto a photoconductor using the scanning device.

25. The method of claim 24, further comprising:
passing the input light beam through the first reflector before the first receiving; and
passing the light beam output from the first reflector through a first optical device.

26. The method of claim 25, further comprising converting light of a first polarization type to light of a second polarization type using the first optical device.

27. The method of claim 25, further comprising:
arranging the first optical device comprising a quarter waveplate at an angle of 45 degrees with respect to an incoming polarization direction in order to reflect a light beam reflected by the scanning device towards the second reflector.

28. The method of claim 27, further comprising:
arranging a second optical device comprising a compensator at an angle of 0 degrees with respect to an incoming polarization direction to rectify misalignment of a light beam passing through the second optical device.

29. The method of claim 24, wherein the second receiving further comprises:
receiving the light beam reflected by the scanning device by a first optical device to convert circularly polarized light of the light beam reflected by the scanning device to linearly polarized light;
receiving the light beam output from the first optical device by a second optical device to rectify misalignment of the light beam passing through the second optical device; and
receiving the light beam output from the second optical device by the first reflector for reflecting towards the second reflector.

30. The method of claim 29, further comprising passing the input light beam through the first reflector and first and second optical devices before the first reflecting.

31. The method of claim 24, further comprising:
individually configuring the first and second reflectors to permit passage of one of the input light beam and the light beam reflected by the scanning device and to reflect another light beam reflected by the scanning device.

32. A hard imaging scanning method comprising:
first providing a rotating reflection device;
second providing first and second reflectors;
third providing light to the reflection device; and
directing the light to a photoconductor using the reflection device, the directing comprising first reflecting the light using the reflection device, redirecting the light reflected from the reflection device to the reflection device using the first reflector and the second reflector, and second reflecting the redirected light to the photoconductor using the reflection device, and wherein the third providing comprises passing the light through the first reflector prior to reflection of the light using the reflection device.

33. The method of claim 32, wherein the first and second reflectors comprise an optical circulator.

34. The method of claim 32, wherein:
the directing further comprises converting circularly polarized light to linearly polarized light after the first reflecting of the light by the reflection device; and
the redirecting comprises converting the linearly polarized light to circularly polarized light that is orthogonal to a polarization state of the light in the third providing.

35. The method of claim 32, wherein the providing the first and second reflectors comprise providing reflectors individually configured to permit passage of light of a first polarization direction while reflecting light having a polarization direction opposite to the first polarization direction.

36. The apparatus of claim 1, wherein one of the reflectors configured to permit the passage of the input light beam is configured to permit the passage of the input light beam prior to reflection of the input light beam using the scanning device.

37. The apparatus of claim 1 wherein the reflectors are positioned intermediate the light source and the scanning device.

38. The apparatus of claim 1, wherein photons of individual ones of the light beams are individually reflected a plurality of times by the scanning device.

39. The apparatus of claim 1, wherein the input light beam, the light beam reflected by the scanning device and the another light beam reflected by the scanning device comprise substantially the same light beam comprising substantially the same photons.

40. The apparatus of claim 15, wherein the input light beam and the output light beam comprise substantially the same light beam comprising substantially the same photons.

41. The device of claim 20, wherein the photoconductor means comprises means for forming latent images responsive to the receiving the output light beam, and further comprising developer/fuser means for applying a marking agent to the latent images for developing the latent images and for transferring the developed images to media.

42. The device of claim 21, wherein the photoconductor is configured to form latent images responsive to the reception of the light beam scanned by the scanning device, and further comprising a developer/fuser assembly configured to apply a marking agent to the latent images to develop the latent images and to transfer the developed images to media.

43. The method of claim 24, wherein the input light beam, the light beam received by the first reflector, the light beam received by the second reflector and the light beam redirected by the second reflector comprise substantially the same light beam comprising substantially the same photons.

44. The method of claim 32, wherein the light first reflected using the reflection device and the redirected light second reflected using the reflection device comprise substantially the same light beam comprising substantially the same photons.

* * * * *